United States Patent [19]

Winterbottom et al.

[11] Patent Number: 5,016,809

[45] Date of Patent: May 21, 1991

[54] THERMAL DEGREASING IN REACTIVE ATMOSPHERES AND SUBSEQUENT BRAZING OF ALUMINUM-BASED SHEETS OR PARTS

[75] Inventors: Walter L. Winterbottom, Farmington Hills; J. Scott Badgley, Dearborn; Linda J. Baumgartner, Livonia, all of Mich.

[73] Assignee: Ford Motor Company, Dearborn, Mich.

[21] Appl. No.: 402,300

[22] Filed: Sep. 5, 1989

[51] Int. Cl.$^5$ .............................................. B23K 1/20
[52] U.S. Cl. ............................. 228/205; 228/263.17; 134/2; 134/3
[58] Field of Search ............ 134/2, 3, 40–42, 134/20; 228/205, 220, 263.17, 221, 219, 217; 148/13, 20.3; 75/68 R

[56] References Cited

U.S. PATENT DOCUMENTS

| | | | |
|---|---|---|---|
| 2,104,102 | 1/1938 | Ruthven | 134/10 |
| 2,595,411 | 5/1952 | Ripoche | 134/15 |
| 2,856,333 | 10/1958 | Topelian | 75/65 R |
| 3,627,289 | 12/1971 | Erman | 134/18 |
| 3,650,830 | 3/1972 | Mathis | 134/19 |
| 4,010,935 | 3/1977 | Stephens | 75/65 R |
| 4,016,003 | 4/1977 | Stauffer | 134/19 |
| 4,240,574 | 12/1980 | Schmatz et al. | 228/217 |
| 4,325,753 | 4/1982 | Baur | 148/20.3 |
| 4,508,564 | 4/1985 | Kennedy | 75/65 R |
| 4,654,088 | 3/1987 | Fitzpatrick et al. | 134/18 |
| 4,684,411 | 8/1987 | Johnsen et al. | 134/15 |
| 4,804,128 | 2/1989 | Brittin | 228/217 |

FOREIGN PATENT DOCUMENTS

| | | | |
|---|---|---|---|
| 92162 | 5/1984 | Japan | 228/263.17 |
| 1091992 | 4/1989 | Japan | 228/263.17 |

OTHER PUBLICATIONS

Hetherington, "VLVAC Aluminum Brazing Furnaces" Supp. to VLVAC Sale Brochure E2009.

*Primary Examiner*—Kenneth J. Ramsey
*Attorney, Agent, or Firm*—Peter D. McDermott; Roger L. May

[57] ABSTRACT

Aluminum-based sheets or parts, such as formed aluminum assemblies contaminated with forming die lubricants, are cleaned by a solventless, thermal degreasing process at controlled temperature (about 300°–400° F.), and in specified atmospheres (reactive gas which is at least at atmospheric pressure) prior to brazing. The organic contaminates on the aluminum-based sheet or part are reacted with the reactive gas (air or oxygen) and removed from the surface of the sheet or part without disruption of the underlying protective oxide layer. Subsequent brazing is thereby facilitated.

20 Claims, No Drawings

THERMAL DEGREASING IN REACTIVE ATMOSPHERES AND SUBSEQUENT BRAZING OF ALUMINUM-BASED SHEETS OR PARTS

BACKGROUND OF THE INVENTION

The present invention generally relates to a solventless, thermal degreasing process and, more particularly, it relates to solventless, thermal degreasing of aluminum-based sheets or parts in a reactive gaseous atmosphere and subsequent brazing of the cleaned aluminum-based sheets or parts.

Degreasing of metal is well established in the art and has been used extensively in processing metallic scrap material. Representative of the prior art patents relating to the degreasing of metallic scrap are U.S. Pat. Nos. to Kennedy (4,508,564), Fitzpatrick (4,654,088), Ruthven (2,104,102), Mathis (3,650,830), Erman (3,627,289), Ripoche (2,595,411), and Stephens (4,010,935).

However, none of these references disclose a method whereby degreasing takes place in a solventless atmosphere. For example, Ruthven (2,104,102) discloses a thermal degreasing method which involves dipping a heated article in a solvent such as trichloroethylene at such a rate and in such quantity that the article will obtain a temperature of at least the vapor temperature of the solvent after the article leaves the bath of boiling solvent so that the article is devoid of a film of solvent as well as of greasy material when it leaves the vapor atmosphere. The use of solvents, such as trichloroethylene, for the reactive atmosphere during degreasing is an expense and may pose environmental concerns.

In addition, a problem which has occurred with degreasing methods at elevated temperatures especially when using aluminum-based parts has been the further oxidation of the underlying aluminum alloy surface or the complete destruction of the protective oxide layer which normally exists. U.S. Pat. No. (2,856,333) Topelian and U.S. Pat. No. (4,684,411) Johnson et al both specifically disclose oxidizing the underlying aluminum-based alloy as part of their thermal degreasing method. By increasing the thickness of the initial thin, protective oxide layer of aluminum-based alloys in this manner, subsequent brazeability of the metallic alloy is severely compromised. That is, the additional oxidation, that can occur in high temperature thermal degreasing (i.e., around 500° C. and above) forms a layer which is not readily brazeable. With magnesium bearing alloys, oxidation produces a duplex oxide on the outermost surface which degrades brazability. Careful maintenance of the temperature during thermal degreasing is necessary in order to prevent disruption of the existant protective aluminum oxide layer and thereby preserve the brazability of the aluminum-based sheet or part.

In this regard, U.S. Pat. No. (4,016,003) Stauffer discloses the careful maintenance of temperatures to avoid ignition of volatile materials which could also conceivably preserve the underlying protective oxide layer of the metallic alloy in cleaning aluminum scrap. However, Stauffer does not control the temperature for this purpose but rather for the purpose of avoiding the ignition of volatiles. Moreover, Stauffer does not subsequently braze the metallic alloy. Rather, Stauffer subsequently melts the alloy as part of the scrap recycling process which clearly destroys the underlying protective oxide layer.

Another degreasing method is shown by Hetherington in "ULVAC Aluminum Brazing Furnaces" Supp. to ULVAC Sales brochure E 3009 "Aluminum Vacuum Brazing Furnace" FB Series, which discloses a degreasing method that has been implemented in the Japanese automotive industry. Hetherington's solventless degreasing method for aluminum based alloys prior to brazing requires drawing a vacuum which precludes oil and grease from completely reacting. This method depends upon the complete evaporation of surface contaminants for surface cleaning. Dissociation of the surface contaminant during evaporation can produce residual surface contaminant species. Moreover, because vacuum conditions are required, Hetherington's degreasing method is not as economical as is desirable.

Accordingly, there remains a need in the art for a degreasing method for aluminum-based alloys which preserves the underlying protective oxide layer so as not to compromise any subsequent brazing and which removes surface contaminants which can not be completely removed by evaporation alone. Further, the degreasing method should be solventless so to reduce cost and do as not to pose any adverse toxicological and/or environmental problems. Also, there is a need for a degreasing method which does not require a drawing a vacuum.

SUMMARY OF THE INVENTION

The present invention provides a thermal degreasing method which satisifies all of the aforementioned needs. In particular, the present invention provides a solventless, thermal degreasing process for cleaning an aluminum-based sheet or part to produce a more readily brazable sheet or part. A method for subsequent brazing of the cleaned aluminum-based sheet or part is also provided.

In the degreasing portion of the instant process, the aluminum-based sheet or part is heated in the presence of a reactive gas such as air or oxygen, ammonia, hydrogen, etc., at least at atmospheric pressure and at a temperature of between 300° and 400° C. for a sufficient period of time, preferably between about 10 minutes to about 30 minutes, to volatize and remove any organic contaminants, such as oils or grease. The process is preferably useful in removing forming die lubricants from formed aluminum assemblies prior to brazing to form heat exchangers for automobile radiators. The reaction of the organic contaminants on the aluminum-based sheet or part with the reactive gas occurs without significant distruption of the underlying protective oxide layer and does not, therefor, interfer with the brazability of the sheet or part. The aluminum-based sheet or part is thereafter allowed to cool prior to brazing or it may be brazed immediately.

Thus, in the preferred process, the aluminum-based sheet or part is brazed relatively shortly after having been cleaned. For that reason it is necessary, as stated above, to preserve the underlying aluminum oxide layer. In order to do so it is essential that the temperature of solventless, thermal degreasing be at or below about 400° C. Any signficantly higher temperatures will alter the aluminum oxide layer and may oxidize any magnesium which is present in the aluminum-based alloy. Preferably the aluminum-based alloy contains some magnesium in order to render it capable of fluxless brazing, which is the preferred brazing process.

The preferred brazing process utilizes a filler metal alloy, such as one containing 89% aluminum, 1.5% magnesium, and 9.5% silicon, in a vacuum at around 600° C. to join the formed, cleaned aluminum-based sheets or parts and form, for example, a heat exchanger for automobile radiators. Ideally the solventless, thermal degreasing process of the present invention is used in the automobile parts plant and is followed shortly thereafter by the preferred fluxless brazing process.

Accordingly, it is an object of the present invention to provide a solventless, thermal degreasing method for aluminum-based alloys which preserves the underlying protective oxide layer so that subsequent brazing is not compromised. Also, it is an object of the present invention to provide a less costly reactive atmosphere for the degreasing process. Finally, it is an object of the present invention to provide a method of brazing aluminum-based sheets or parts which have been cleaned by solventless, thermal degreasing.

Other objects and advantages of the invention will be apparent from the following description and the appended claims.

DETAILED DESCRIPTION OF THE PREFERRED EMBODIMENT

In the preferred embodiment of the present invention an aluminum-based sheet or part such as a formed aluminum assembly which is covered with various forming die lubricants, i.e., oils and/or grease, is heated in the presence of a reactive gaseous atmosphere such that the underlying protective oxide layer of the aluminum-based sheet or part is not disturbed but the organic contaminants are reacted, volatilized, and removed. The cleaned part is thereafter brazed.

The preferred temperature range is from about 300° to 400° C. and the preferred heating time is for about 10 minutes to about 30 minutes. Further, the preferred reactive atmosphere is air at atmospheric pressure although other reactive gases such as oxygen, ammonia, hydrogen, etc., and other pressures greater than atmospheric may also be used.

The process of the invention will now be more particularly described by way of examples which particularly illustrate the removal of lubricating oils and grease from the aluminum-based sheet or part as the sheet or part undergoes the present solventless, thermal degreasing process. The following examples also compare the various process parameters, such as time, temperature, type of oil and reactive atmosphere components. It should be noted that it is preferred to tailor aforementioned parameters to the specific organic contaminant sought to be removed from the sheet or part. Using air as the reactive atmosphere is preferred since it removes most all the forming die lubricants used in the automotive industry.

Table I shown the various aluminum-based sample sheets which were initially coated with various oils:

TABLE I

| Sample | SAMPLE PREPARATION |
|---|---|
| Al-1 | As received (not cleaned) |
| Al-2 | Ultrasonically cleaned in detergent and vapor degreased |
| Al-3 | Coated with press-working oil (#7B-1 for the radiator header from Oak International Chemical); degreased with trichloroethane |
| Al-4 | Surface pretreatment of Al-3; thermally degreased ½ hour at 400° C. in vacuum |
| Al-5 | Coated with Anderson oil (Windsor-Durel #92385C oil from Anderson oil and Chemical Company); thermally degreased ½ hour at 400° C. in vacuum |
| Al-6 | Coated with press-working oil; thermally degreased 1/6 hour at 400° C. in vacuum |
| Al-7 | Duplicate of Al-3 |
| Al-8 | Surface pretreatment of Al-3; thermally degreased ½ hour at 400° C. in air |
| Al-9 | Surface pretreatment of Al-5; thermally degreased ½ hour at 400° C. in air |
| Al-10 | Surface pretreatment of Al-6; thermally degreased ½ hour at 400° C. in air |

The study of this example determined the thermal degreasing residues under both vacuum and air reactive atmospheres. Subsequently, surface analyses were performed with X-ray Photoelectron Spectrosopy (hereinafter XPS) which is a technique that provides an analysis of the top 40 angstroms of the surface.

Two oils were used on the samples which were all made from aluminum braze sheet, MD-177, with both sides clad. One oil was Oak International Chemical press-working oil #7B-1 for radiator headers (referred to in Table I as press-working oil), and the other oil was Windsor-Durel #92385C thermal degreasing oil from Anderson Oil & Chemical Company (referred to in Table I as Anderson oil). Because the Anderson oil has a lower viscosity in comparsion to the press-working oil, significantly lighter loadings were obtained therewith. The oils were applied to one surface of the sample by swabbing. Table I describes the surface pretreatment and oil loading combinations studied. Table II below illustrates the oil coating weights:

TABLE II

| | OIL COATING WEIGHTS | |
|---|---|---|
| Samples | Weight of Oil Coating (g/cm$^2$) | Weight Loss in Thermal Degreasing (g/cm$^2$) |
| | | (In Vacuum) |
| Al-5 | 0.072 | 0.109 |
| Al-6 | 0.240 | 0.277 |
| | | (In Air) |
| Al-9 | 0.047 | 0.052 |
| Al-10 | 0.211 | 0.239 |

Table II would indicate that, the present invention's thermal degreasing process removed more volatile material from the surfaces of the samples than can be accounted for by the oil coating weight. However, a much more sensitive measure of the residue remaining after degreasing has been obtained with XPS, and the results are shown in Table III:

TABLE III

| | SURFACE CHEMICAL ANALYSIS OF OIL CONTAMINATED Al BRAZE SAMPLES | | | | | | | | | | | | | |
|---|---|---|---|---|---|---|---|---|---|---|---|---|---|---|
| | % Mg | % Na | % Al | % Si | % S | % C | % N | % O | % Cu | % P | % Cl | % F | %C as carbonyl | %Al as metal |
| Al-1 | | 1.1 | 1.3 | 1.7 | .51 | 84.4 | .53 | 10.4 | | | | | 7.2 | 0.0 |
| Al-2 | 2.1 | | 21.6 | .49 | | 38.9 | .72 | 35.4 | | .59 | | | 24.0 | 7.6 |
| Al-3 | 1.6 | .55 | 19.3 | .37 | .24 | 44.5 | .87 | 31.3 | | .31 | | .80 | 25.4 | 10.6 |

TABLE III-continued

SURFACE CHEMICAL ANALYSIS OF OIL CONTAMINATED Al BRAZE SAMPLES

| | % Mg | % Na | % Al | % Si | % S | % C | % N | % O | % Cu | % P | % Cl | % F | %C as carbonyl | %Al as metal |
|---|---|---|---|---|---|---|---|---|---|---|---|---|---|---|
| Al-4 | 6.5 | .26 | 17.7 | .54 | .80 | 50.2 | .83 | 20.1 | 2.0 | | | | 19.0 | |
| Al-5 | 6.2 | .29 | 19.4 | .56 | | 41.6 | | 30.4 | | | | | 13.9 | 8.7 |
| Al-6 | 5.9 | .52 | 17.0 | .57 | | 36.3 | | 34.1 | | 3.6 | | | 13.3 | 7.5 |
| Al-7 | 1.8 | .37 | 19.4 | .56 | .57 | 40.4 | 1.4 | 35.0 | | | .52 | | 32.6 | 10.7 |
| Al-8 | 9.8 | .31 | 16.6 | .33 | | 33.0 | 1.3 | 38.6 | | | | | 22.0 | 3.1 |
| Al-9 | 11.5 | | 16.4 | .52 | .59 | 33.3 | | 37.7 | | | | | 21.0 | 4.7 |
| Al-10 | 10.2 | 1.4 | 15.8 | .36 | | 29.8 | | 41.0 | | | 1.5 | | 20.8 | 5.2 |

With regard to Table III and each aluminum-based sample therein, the following composition characteristics of the surfaces were noted. The sample Al-1 had a contamination layer composed mainly of 84% carbon (7% carbonyl type binding and 93% hydrocarbon). The small aluminum concentration detected and the absence of metallic aluminum indicates that the hydrocarbon layer is roughly as thick as the escape depth of the secondary electrons being used in the analysis which is approximately 40 angstroms.

Sample Al-2 had a contamination layer composed of 38% carbon (24% carbonyl and 76% hydrocarbon), 35% oxygen and 22% aluminum (see Table III). Sample Al-2, which was not coated with an oil layer, was first ultrasonically cleaned in detergent and subsequently vapor degreased. The results indicate that the contamination has been reduced in thickness (about 40 angstroms) by the degreasing process.

Sample Al-3, which was coated with press working oil, was degreased with trichloroethane. The contamination layer thickness was similar to the ultrasonically degreased surface of sample Al-2. The sample Al-3 layer was composed of 44% carbon (25% carbonyl and 75% hydrocarbon), 31% oxygen and 19% aluminum (see Table III). Similar results are shown for Sample A-7. Again, the resulting thickness of the organic residue and the underlying oxide layer was approximately 40 angstroms.

For comparison, samples Al-4, Al-5, and Al-6 were thermally degreased under vacuum at 1×10-5 Torr (1.3×10-3 Pa) and at a temperature of 400° C. The contamination layer of Al-4 was composed of 50% carbon (19% carbonyl and 81% hydrocarbon), 20% oxygen, 18% aluminum and 6% magnesium (see Table III). The combined thickness of the organic residue and oxide layer is larger than that of Al-1 and Al-3. The resulting larger carbon and smaller oxygen concentrations indicate that a thicker organic layer is responsible for the difference.

Sample Al-5 was coated with Anderson Oil and also thermally degreased under vacuum conditions at 400° C. The low-level contamination layer consisted of 42% carbon (14% carbonyl and 86% hydrocarbon), 30% oxygen, 19% aluminum and 6% magnesium (see Table III). XPS results indicated that the combined thickness of the organic residue and oxide layer was minimal, and similar to samples Al-2 and Al-3 which were solvent degreased.

Sample Al-6 also had a low-level contamination layer which consisted of 36% carbon (13% carbonyl and 87% hydrocarbon), 34% oxygen, 17% aluminum, 6% magnesium and 4% phosphorous (see Table III). Similar to samples Al-2 and Al-3, the combined thickness of organic residue and oxide layer was minimal. A small concentration of phosphorous was detected but this is attributed to the residue characteristic of press-working oil.

Samples Al-8, Al-9 and Al-10 were thermally degreased in air at 400° C. for ½ hour. Sample Al-8 was coated with press-working oil and then thermally degreased at the aforementioned conditions. The low-level contamination level consisted of 33% carbon (22% carbonyl and 78% hydrocarbon), 39% oxygen, 17% aluminum, and 10% magnesium (see Table III). As indicated by the relative concentration of metallic aluminum, the combined thickness of the organic residue and oxide layer is only marginally larger than for the degreased samples Al-2 and Al-3 and the samples thermally degreased in vacuum, Al-5 and Al-6. The larger oxygen and combined aluminum and magnesium concentrations indicate that a slightly thicker oxide layer is present, presumably composed of a duplex of magnesium and aluminum oxide. The results indicate that the oxide layer is is only marginally thicker than found with the vacuum thermal degreasing process and of further importance, the organic residue is minimal. Subsequent brazing test have shown that the small amount of oxidation occurring during thermal degreasing in air does not degrade fluxless braze performance.

Sample Al-9 which was coated with Anderson Oil also had a low-level contamination layer primarily consisting of 33% carbon (21% carbonyl and 79% hydrocarbon), 38% oxygen, 16% aluminum and 11% magnesium (see Table III). The results indicated that the precent of carbon with carbonyl type bonding and the concentration of magnesium were increased by thermally degreasing in air relative to vacuum which indicates that oxidation of the organic contaminant and the magnesium occurs more readily in air processing. Relative thicknesses of the organic and oxide layers were similar to those observed with sample Al-8.

Sample Al-10, which was coated with press-working oil and thermally degreased in air at 400° C., had a contamination layer consisting of 30% carbon (21% carbonyl and 79% hydrocarbon), 41% oxygen, 16% aluminum, and 10% magnesium (see Table III). The results indicated some oxidation of the organic contaminant and magnesium. The thickness of the organic and oxide layers were similar to samples Al-8 and Al-9. Also, the residual phosphorous level was approximately half the level resulting from vacuum processing which implies that oxidation had assisted in the removal of the residue.

The aforementioned results indicate that thermal degreasing in air is preferrable over a vacuum or solvent vapor. Thus, solventless thermal degreasing in air provides a viable alternative to vapor degreasing using a solvent such as trichloroethylene and also provides a more cost-effective reactive atmosphere. It should be noted that the preferred aluminum-based sheet or part will be one which is in need of cleaning so as to improve its subsequent brazability.

Having thus described the thermal degreasing process of the present invention in detail and by reference to a preferred embodiment thereof, it will be apparent that certain modifications and variations are possible without departing from the scope of the invention defined in the appended claims:

What is claimed is:

1. A solventless, thermal decreasing process for cleaning an aluminum-based sheet or part to product a more readily brazable aluminum-based part sheet or part, comprising:
    (a) providing said aluminum-based sheet or part having organic contaminants thereon and in need of cleaning to improve its brazability, and
    (b) heating said sheet or part in the presence of a reactive gas at least at atmospheric pressure and at a temperature of between about 300 and 400° C. for about 10 minutes to about 30 minutes to volatize and remove said organic contaminants by reacting said organic contaminants with said reactive gas without significantly disturbing the underlying aluminum oxide layer.

2. The solventless thermal degreasing process of claim 1 further including the step of cooling said aluminum-based sheet or part.

3. The solventless thermal degreasing process of claim 1 wherein said reactive gas is air or oxygen.

4. The solventless thermal degreasing process of claim 1 wherein said temperature of heating is approximately 400° C.

5. The solventless thermal degreasing process of claim 1 wherein said organic contaminants are oils and grease.

6. The solventless thermal degreasing process of claim 1 wherein said aluminum-based sheet or part is a formed aluminum assembly.

7. The solventless thermal degreasing process of claim 6 wherein said organic contaminants are forming-die lubricants.

8. The solventless thermal degreasing process of claim 7 wherein said reactive gas is air, said temperature of heating is approximately 400° C., and said period of time of heating is about 30 minutes.

9. The solventless thermal degreasing process of claim 8 wherein said pressure is atmospheric.

10. A method of brazing aluminum-based sheets or parts, comprising:
    (a) providing said aluminum-based sheet or part having organic contaminants thereon and in need of cleaning to improve its brazability;
    (b) heating said sheet or part in the presence of a reactive gas at least at atmospheric pressure and at a temperature of between about 300° and 400° C. for about 10 minutes to about 30 minutes to volatize and remove said organic contaminants by reacting said organic contaminants with said reactive gas without significantly disturbing the underlying aluminum oxide layer; and, thereafter,
    (c) brazing said aluminum-based sheet or part with a brazing material.

11. The method of claim 10 wherein said aluminum-based sheet or part contains magnesium.

12. The method of claim 11 wherein said brazing is a fluxless brazing.

13. The method of claim 12 wherein said aluminum-based sheets or parts are formed aluminum assemblies which are to be joined to form a heat exchanger.

14. The method of claim 13 wherein said organic contaminants are forming-die lubricants.

15. The method of claim 14 wherein said reactive gas is air, said temperature of heating is approximately 400° C., and said period of time of heating is about 30 minutes.

16. The method of claim 15 wherein said pressure is atmospheric.

17. The method of claim 12 wherein said brazing material is a filler metal alloy containing approximately 89% aluminum, 1.5% magnesium, and 9.5% silicon.

18. The method of claim 17 wherein said fluxless brazing takes place in a vacuum at around 600° C.

19. The method of claim 10 including the step of cooling said aluminum-based sheet or part prior to brazing.

20. A method of brazing formed aluminum assemblies, comprising:
    (a) providing a formed aluminum assembly having forming-die lubricants thereon and in need of cleaning to improve its brazability;
    (b) heating said assembly in the presence of air at atmospheric pressure to a temperature of approximately 400° C. for about 30 minutes to volatize and remove said forming-die lubricants without significantly disturbing the underlying aluminum oxide layer; and, thereafter,
    (c) brazing said formed aluminum assembly in vacuum at a temperature of around 600° C.

* * * * *